US012494561B2

(12) United States Patent
Billod et al.

(10) Patent No.: US 12,494,561 B2
(45) Date of Patent: Dec. 9, 2025

(54) FLEXIBLE WAVEGUIDE DEVICE AND METHOD FOR MANUFACTURING SUCH A DEVICE

(71) Applicant: SWISSto12 SA, Renens (CH)

(72) Inventors: Mathieu Billod, Présilly (FR); Alexandre Dimitriades, Nyon (CH)

(73) Assignee: SWISSto12 SA, Renens (CH)

( * ) Notice: Subject to any disclaimer, the term of this patent is extended or adjusted under 35 U.S.C. 154(b) by 408 days.

(21) Appl. No.: 18/001,798

(22) PCT Filed: Jun. 16, 2021

(86) PCT No.: PCT/IB2021/055303
§ 371 (c)(1), (2) Date: Jun. 9, 2023

(87) PCT Pub. No.: WO2021/255660
PCT Pub. Date: Dec. 23, 2021

(65) Prior Publication Data

US 2024/0304974 A1 Sep. 12, 2024

(30) Foreign Application Priority Data

Jun. 17, 2020 (FR) ....................................... 2006344

(51) Int. Cl.
*H01P 3/14* (2006.01)
*H01P 11/00* (2006.01)

(52) U.S. Cl.
CPC .............. *H01P 3/14* (2013.01); *H01P 11/002* (2013.01)

(58) Field of Classification Search
CPC ................................ H01P 3/14; H01P 11/002
See application file for complete search history.

(56) References Cited

U.S. PATENT DOCUMENTS

| | | | | |
|---|---|---|---|---|
| 3,940,718 A | | 2/1976 | Vilkaitis | |
| 4,429,290 A | * | 1/1984 | Devan | H01P 3/14 333/241 |
| 6,519,500 B1 | | 2/2003 | White | |
| 2003/0038691 A1 | * | 2/2003 | Fiedziuszko | H01P 3/14 333/241 |

FOREIGN PATENT DOCUMENTS

| | | |
|---|---|---|
| GB | 1078575 A | 8/1967 |
| WO | 2017039619 A1 | 3/2017 |
| WO | 18029455 A1 | 2/2018 |
| WO | 2019243766 A1 | 12/2019 |

OTHER PUBLICATIONS

International Search Report for PCT/IB2021/055303 dated Sep. 24, 2021.
Written Opinion for PCT/IB2021/055303 dated Sep. 24, 2021.

* cited by examiner

*Primary Examiner* — John W Poos
(74) *Attorney, Agent, or Firm* — McDonald Hopkins LLC

(57) ABSTRACT

A flexible waveguide device, of the bellows type, for guiding a radio frequency signal at a given frequency range. The device includes: a core including outer and inner side walls, the inner walls delimiting a waveguide channel; two fixing flanges connected to or integral with respective ends of the core, and at least one flexible corrugated portion formed on a part of the outer side walls of the core and including a plurality of circumferential ribs adjacent to each other. Each rib is devoid of corrugation along its circumference. Also, a method of manufacturing the flexible waveguide device.

15 Claims, 4 Drawing Sheets

FLEXIBLE WAVEGUIDE DEVICE AND METHOD FOR MANUFACTURING SUCH A DEVICE

FIELD OF THE INVENTION

The present invention relates to a waveguide device and more particularly to a flexible waveguide device capable of adapting its length and the orientation of its ends according to the circumstances in order to facilitate its assembly. The flexible waveguide device according to the invention has the further advantage of absorbing vibrations or shocks. The invention also relates to a method of manufacturing such a device.

STATE OF THE ART

Radio frequency (RF) signals can propagate either in free space or in waveguide devices. These waveguide devices are used to channel RF signals or to manipulate them in the spatial or frequency domain.

The present invention relates in particular to passive RF devices that allow the propagation and manipulation of radio frequency signals without the use of active electronics. Passive waveguides can be divided into three distinct categories:

- Devices based on wave guidance inside hollow metal channels, commonly called waveguides.
- Devices based on wave guidance inside dielectric substrates.
- Devices based on wave guidance by means of surface waves on metal substrates such as PCBs, microstrips, etc.

The present invention relates in particular to the first category above, hereinafter collectively referred to as waveguides. Examples of such devices include waveguides per se, filters, antennas, mode converters, etc. Examples of such devices include waveguides per se, filters, antennas, mode converters, etc. They can be used for signal routing, frequency filtering, separation or recombination of signals, transmission or reception of signals into or from free space, etc.

Waveguides are typically made of conductive material, for example of metal, by extrusion or bending. The realization of waveguides with complex cross-sections by conventional manufacturing methods is difficult and costly. However, recent work has shown that waveguide components can be produced using additive manufacturing methods, for example by 3D printing. It is known, in particular, that waveguides formed in conductive materials can be additively manufactured.

Flexible waveguides made by additive manufacturing are also known.

As an example, WO18029455 discloses a waveguide assembly for an RF signal network, comprising a plurality of waveguides, wherein at least two of the plurality of waveguides are integrally formed with each other. At least one of the plurality of waveguides may be flexible, which may improve interface loads and allow adjustment of interface planes to facilitate mounting.

GB1078575 discloses a conventional method of manufacturing "bellows" type flexible waveguides. A mandrel having the same shape as the inside of a flexible waveguide is made. A layer of copper or copper alloy is then electroformed onto the mandrel to achieve the required thickness on the mandrel surface. A flange is then welded to each end of the applied layer. Finally, a protective rubber film is molded onto the surface of the electroformed layer between the two flanges and the mandrel is then removed.

The waveguide described in GB1078575 has in particular the disadvantage of being difficult to conceive, which has a non-negligible impact on the cost of this type of waveguide.

WO2019/243766 discloses an elongated flexible waveguide section for radio frequency signals. The waveguide section is corrugated in the longitudinal direction, and the waveguide section is at least partially corrugated in a circumferential direction perpendicular to the longitudinal direction. The manufacture of such a waveguide is relatively difficult to implement.

An aim of the present invention is to provide a method of manufacturing a flexible waveguide device exempt from the limitations of the prior art.

In particular, an aim of the present invention is to provide a flexible waveguide device that is easy to conceive by an improved manufacturing process.

Another aim of the present invention is to provide a flexible waveguide device at a reduced cost.

According to the invention, these aims are achieved in particular by means of a method of manufacturing a flexible waveguide device, of the "bellows" type, comprising a core through which a channel passes in order to guide a radio frequency signal at a given frequency. The method comprises the following steps:

- making by additive manufacturing a mandrel having an outer shell comprising a corrugated portion having a plurality of adjacent circumferential ribs
- depositing a metal layer on the outer shell of the mandrel by electroforming to form the core of the device, and
- removing the mandrel from the electroformed metal layer to define the channel.

In an embodiment, the electroformed metal layer has a homogeneous thickness between 0.05 and 5 mm and preferably between 0.1 and 0.5 mm.

In an embodiment, the mandrel is manufactured so as to obtain a hollow mandrel.

In an embodiment, the mandrel is dissolved away with a dissolving solution.

In an embodiment, the mandrel and the metal layer formed on the outer shell of the mandrel are immersed in a solvent bath.

In an embodiment, two fixing flanges are fixed to the respective ends of the core, preferably by brazing.

In an embodiment, two fixing flanges are integrated into the geometry of the mandrel so that the fixing flanges are integral with the respective ends of the core.

In an embodiment, inserts or other fixing elements are assembled on the mandrel and then encapsulated in the metal layer when the latter is electroformed onto the outer shell of the mandrel to form the core of the device.

Another aspect of the invention relates to a flexible waveguide device, of the bellows type, for guiding a radio frequency signal at a given frequency range. The device comprises:

- a core comprising outer and inner side walls, the inner walls delimiting a waveguide channel,
- two fixing flanges connected to or integral with respective ends of the core, and
- at least one flexible corrugated portion.

The flexible corrugated portion is formed on a part of the outer side walls of the core and comprises a plurality of circumferential ribs around the core which are adjacent to each other. Each rib lies in a plane orthogonal to the channel axis when the flexible waveguide device is in an unfolded configuration. Each rib is devoid of corrugation along its circumference.

In an embodiment, the flexible corrugated portion may or may not be centered with respect to the two fixing flanges.

In an embodiment, the distance between each adjacent rib may vary between 0.1 and 5.0 mm and preferably between 0.5 and 2.0 mm as the device moves from a compressed configuration to an expanded configuration.

In an embodiment, a plurality of distinct flexible corrugated portions are formed on respective parts of the outer side walls of the core.

In an embodiment, three flexible corrugated portions are formed on the outer sidewall part of the core. Two of the three flexible corrugated portions are respectively adjacent to the first and second fixing flanges while one of the three flexible corrugated portions is centered or not with respect to said fixing flanges.

In an embodiment, the cross-section of the core along the channel is circular, elliptical, oval, hexagonal, square or rectangular.

In an embodiment, the cross-section of the core is non-constant along the channel.

In an embodiment, the two fixing flanges comprise each a reinforcement in order to increase the rigidity of the flanges.

In an embodiment, the outer side walls of the core are an electroformed part. Inserts or other fixing elements are encapsulated in the electroformed part.

BRIEF DESCRIPTION OF THE FIGURES

Examples of embodiments of the invention are shown in the description illustrated by the attached figures in which.

EXAMPLE(S) OF EMBODIMENTS OF THE INVENTION

Figure 6:
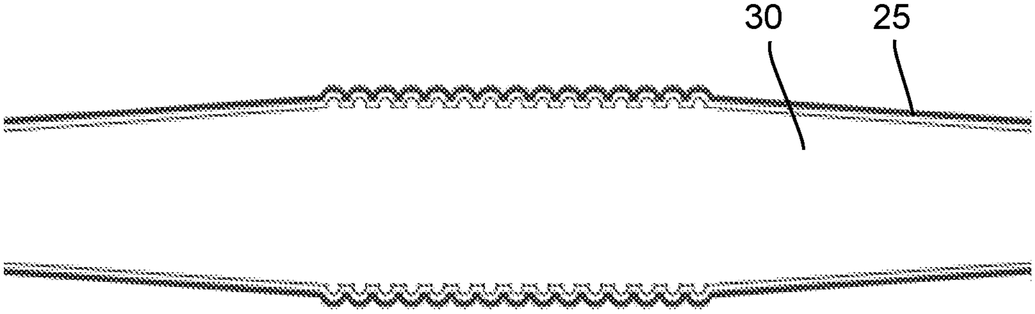
FIG. 6 shows an axial section of a mandrel with a metal layer formed by electrodeposition.

The flexible waveguide device 10, of the bellows type, illustrated in FIGS. 1 to 4 comprises a core 12 having outer side walls 14*a* and inner side walls 14*b* (FIG. 6). The inner walls 14*b* define a waveguide channel 16.

Two fixing flanges 18*a*, 18*b* are connected to respective ends of the core 12. One or both of the fixing flanges 18*a*, 18*b* may include a reinforcement (not shown) so as to increase the rigidity thereof.

A flexible corrugated portion 20, of the bellows type, is formed on the outer side walls 14*a* of the core 12

The flexible portion 20 of the waveguide device 10 is centered with respect to the two fixing flanges 18*a*, 18*b* and comprises a plurality of adjacent ribs 22. These ribs 22 extend along the perimeter of the core 12 in a substantially rectangular trajectory. However, the trajectory of the ribs may vary depending on the geometry of the core 12.

For example, the ribs 22 may follow a circular trajectory. The distance between each adjacent rib may vary between 0.1 and 5.0 mm and preferably between 0.5 and 2.0 mm as the device moves from a compressed configuration to an extended configuration.

Figure 1:
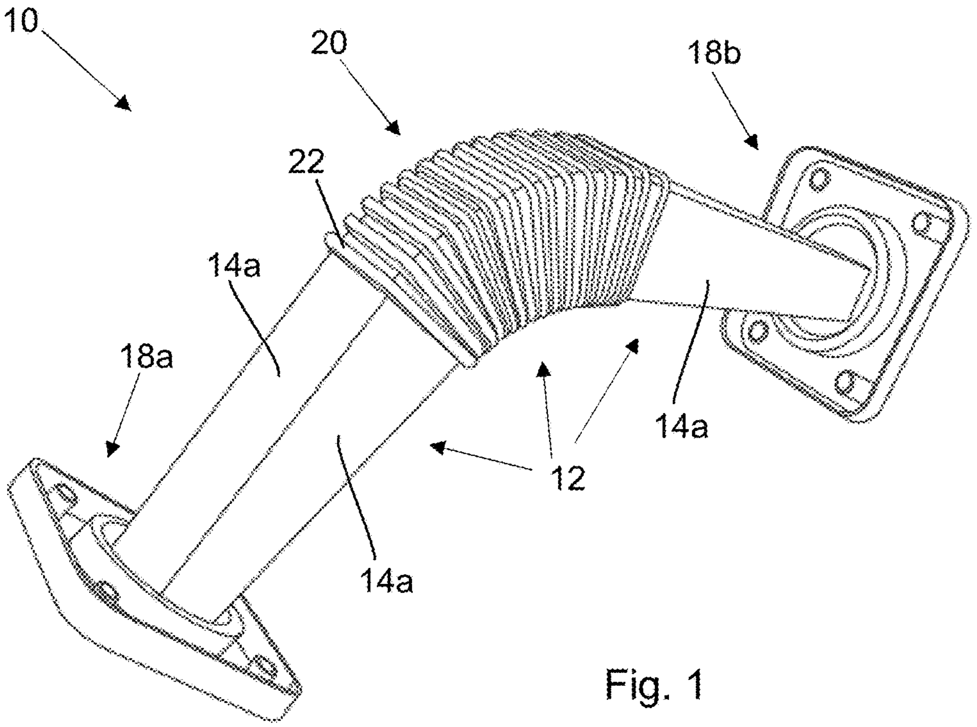
FIG. 1 shows a perspective view of a flex waveguide device, of the bellows type, in a folded configuration, according to an embodiment of the invention.
Figure 2A:
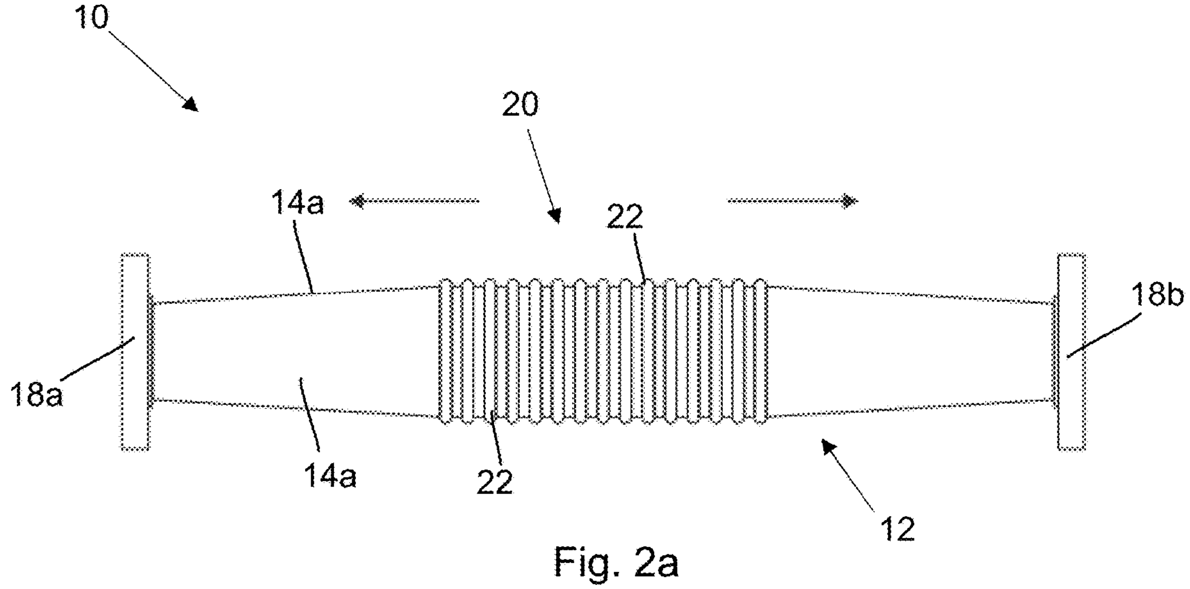
FIG. 2A shows a side view of the waveguide device of FIG. 1 in a second position in which the device is arranged along a longitudinal axis when the bellows is in an extended configuration.
Figure 2B:
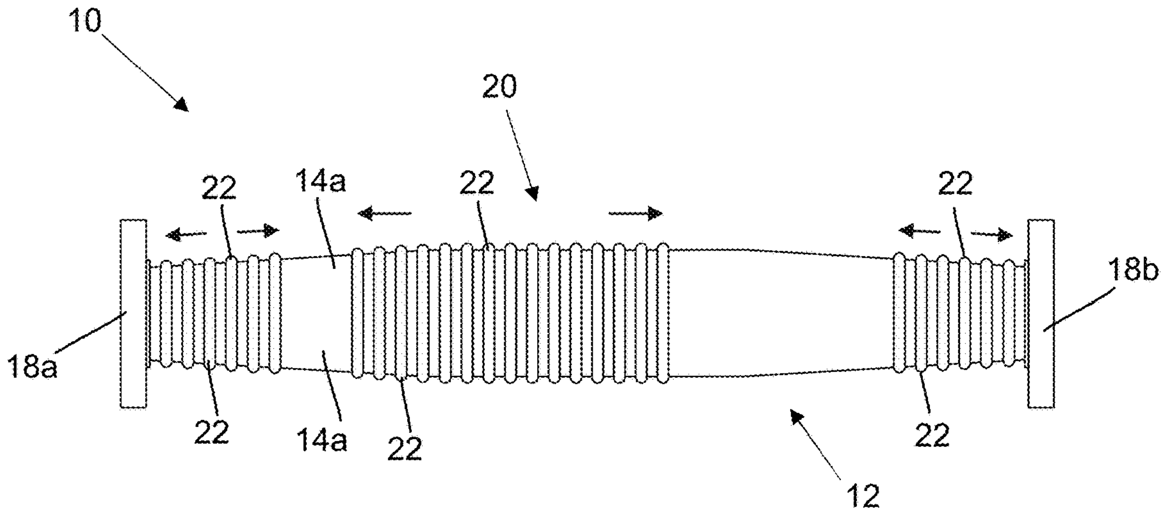
FIG. 2B shows a side view of the waveguide device of FIG. 1 comprising at least three flexible corrugated portions, two such portions being adjacent to a flange of the waveguide device.
Figure 2C:
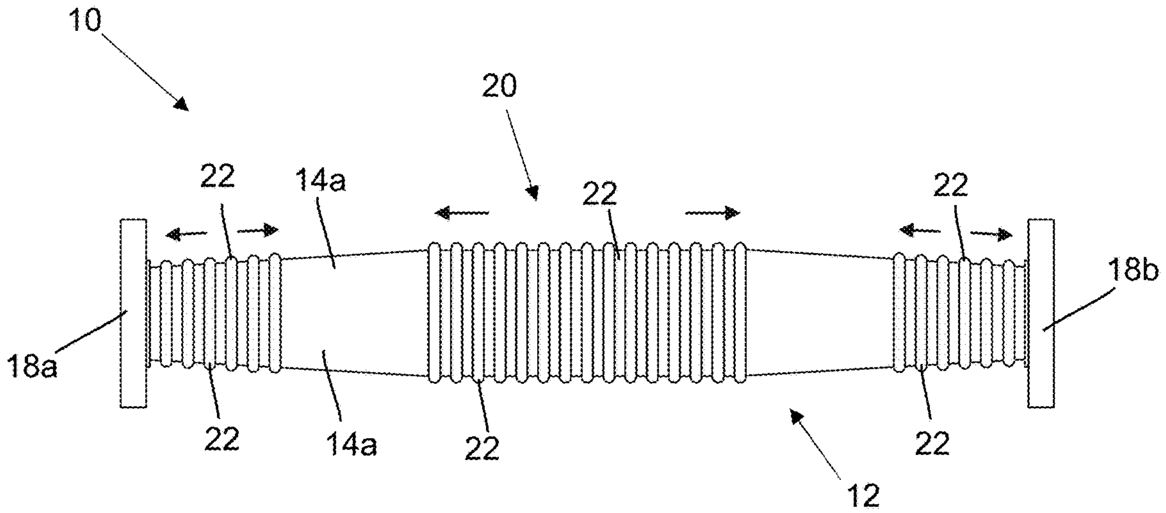
FIG. 2C shows a side view of the waveguide device of FIG. 1 comprising at least three flexible corrugated portions, two such portions being adjacent to a flange of the waveguide device and one such portion being centered with respect to the flanges.
Figure 3:
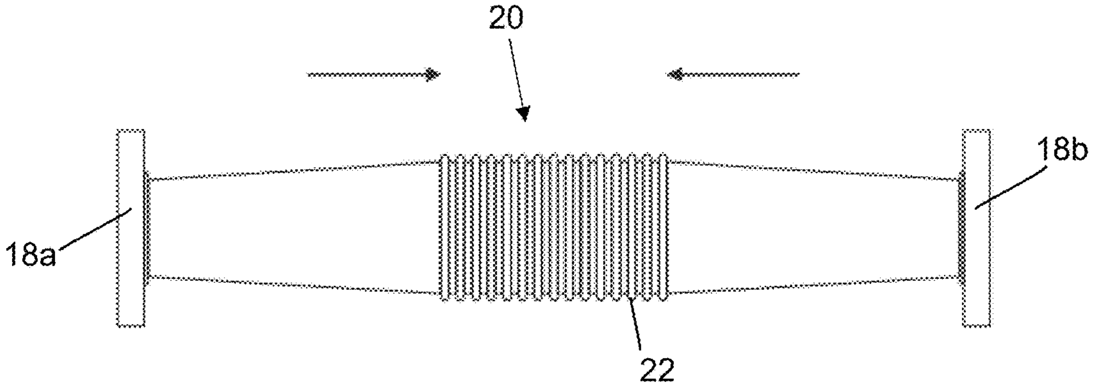
FIG. 3 shows a view similar to FIG. 2A when the bellows is in a compressed configuration.
Figure 4:
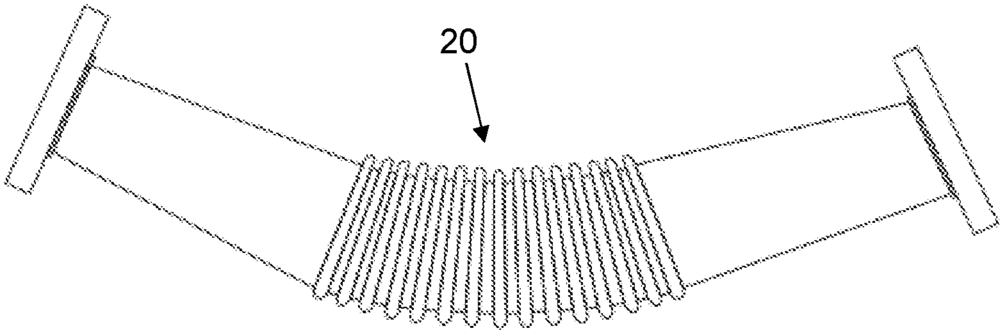
FIG. 4 shows a view similar to FIG. 2A when the bellows is in a folded configuration.
Figure 5:
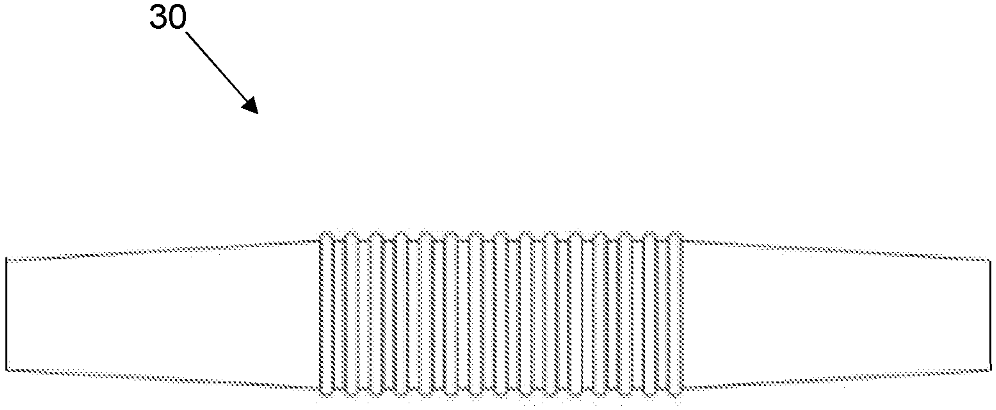
FIG. 5 shows a side view of a mandrel used to manufacture the flexible waveguide device according to FIGS. 1 to 4.

The waveguide device 10, illustrated in particular in FIG. 1, is made from a mandrel 30, illustrated in FIG. 5, which defines the outer shell of the device 10. The mandrel 30 is made by additive manufacturing.

In the present application, the term "additive manufacturing" refers to any method of manufacturing the mandrel 30 by adding material, according to computer data stored on the computer medium and defining the geometric shape of the mandrel.

In addition to stereolithography, the term also refers to other manufacturing methods such as liquid or powder curing or coagulation, including but not limited to binder jetting, DED (Direct Energy Deposition), EBFF (Electron Beam Freedom fabrication), FDM (Fused Deposition Modeling) PFF (Plastic Free Forming), aerosol, BPM (Ballistic Particle Manufacturing), SLM (Selective Laser Melting), SLS (Selective Laser Sintering), ALM (Additive Layer Manufacturing), polyjet, EBM (Electron Beam Melting), photopolymerisation, etc.

The mandrel 30 is preferably manufactured so as to obtain a hollowed mandrel with a minimum wall thickness determined so that the mandrel 30 has sufficient mechanical strength for the electrodeposition step while having the advantage of being able to be dissolved rapidly, the minimum time for dissolving the mandrel being of the order of 4 hours.

The mandrel 30 obtained by additive manufacturing is subjected to a surface treatment to make it suitable for the deposition of a metal layer 25 by electrodeposition (FIG. 6).

Copper or copper alloys, such as copper-tin, copper-zinc, or silver or silver alloy with a thickness varying between 0.05 mm and 5 mm is deposited on the surface of the mandrel by electrodeposition. Uniformity of thickness over the entire layer of deposited metal is very important to obtain a flexible waveguide with good mechanical properties.

Once the metal layer is deposited on the outer shell of the mandrel 30 by electroforming to form the core 12 of the device 10, the mandrel 30 and the metal layer 25 formed on the outer shell of the mandrel are immersed in a solvent bath.

The dissolving bath may be a succession of acidic or basic baths with immersion times ranging from 1 hour to 48 hours.

In an embodiment, during manufacturing of the flexible waveguide device 10, the two fixing flanges 18*a*, 18*b* are fixed to the respective ends of the core 12, for example by brazing. In an alternative embodiment, the two fixing flanges 18*a*, 18*b* are integrated into the geometry of the mandrel so that the fixing flanges are integral with the respective ends of the core 12.

Inserts or other (non-illustrated) fixing elements may be assembled onto the mandrel 30 and then encapsulated in the metal layer when the latter is electroformed onto the outer shell of the mandrel 30 to form the core 12 of the device 10.

The waveguide device 10 may comprise a plurality of separate flexible corrugated portions 20 formed on respective parts of the outer side walls of the core.

For example, the waveguide device 10 may comprise three flexible corrugated portions 20 that are formed on the outer sidewall portion 14*a* of the core 12. Two of the three flexible corrugated portions 20 are respectively adjacent to the first and second fixing flanges 18*a*, 18*b* while one of the three flexible corrugated portions 20 is centered or not with respect to the two fixing flanges 18*a*, 18*b*.

The cross-section of the core 12 along the channel 16 of the waveguide device may for example be circular, elliptical, oval, hexagonal, square or rectangular.

Figure 7:
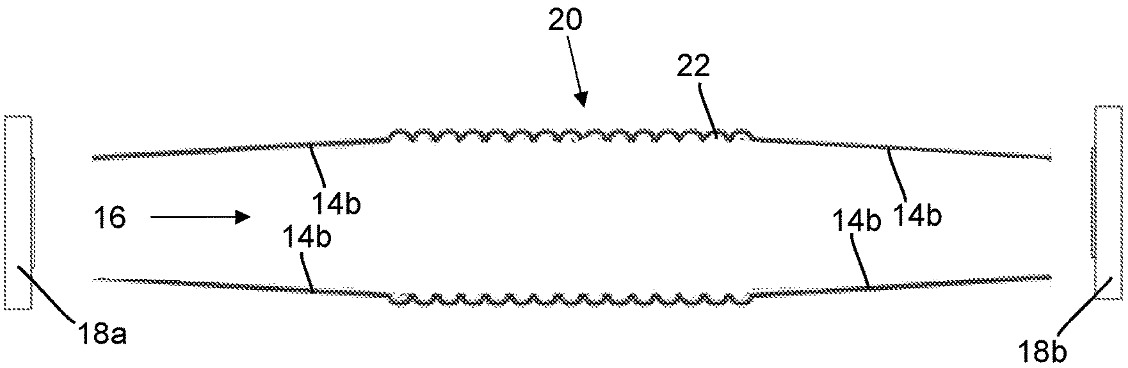
FIG. 7 shows a view similar to FIG. 6 after the mandrel has been dissolved away with two flanges to be fixed to both ends of the flexible waveguide device.
Figure 8:
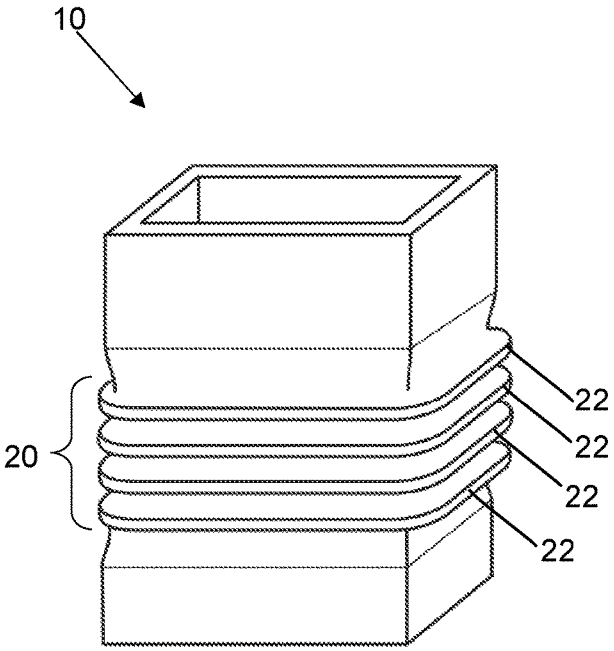
FIG. 8 shows a perspective view of a waveguide in another embodiment when the bellows is in an unfolded configuration.
Figure 9:
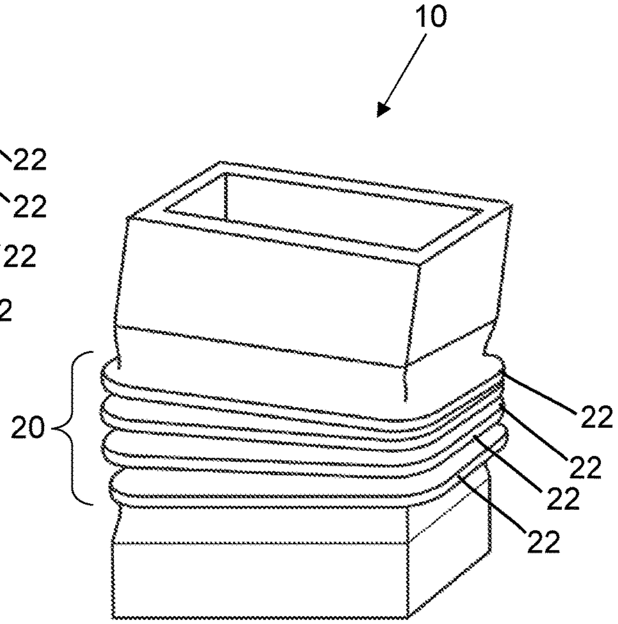
FIG. 9 shows the waveguide of FIG. 8 in a folded configuration.

FIGS. 7 and 8 illustrate a waveguide device 10 of rectangular cross-section according to another embodiment in an unfolded and folded configuration respectively. In this embodiment, the device 10 comprises a flexible corrugated portion 20 having a plurality of adjacent circumferential ribs 22. Each adjacent rib 22 does not have a corrugation along its circumference. When the waveguide device 10 is in an unfolded configuration, the circumferential ribs 22 each lie in a plane orthogonal to the central axis of the channel of the waveguide device 10.

The waveguide device obtained by this manufacturing method has a high mechanical bending strength and thus facilitates its assembly.

What is claimed is:

1. Method of manufacturing a flexible waveguide device, of the bellows type, comprising a core through which a channel passes in order to guide a radio frequency signal at a given frequency, the method comprises the following steps:

making by additive manufacturing a mandrel having an outer shell comprising a corrugated portion having a plurality of adjacent circumferential ribs, depositing a metal layer on the outer shell of the mandrel by electroforming to form the core of the device, and removing the mandrel from the electroformed metal layer to define the channel, wherein the mandrel is manufactured so as to obtain a hollow mandrel.

2. Method of claim 1, wherein the electroformed metal layer has a homogeneous thickness between 0.05 to 5 mm and preferably between 0.1 to 0.5 mm.

3. Method of claim 1, wherein the mandrel is dissolved away with a dissolving solution.

4. Method of claim 1, wherein the mandrel and the metal layer formed on the outer shell of the mandrel are immersed in a solvent bath.

5. Method of claim 1, wherein two fixing flanges are fixed to the respective ends of the core, preferably by brazing.

6. Method of claim 1, wherein two fixing flanges are integrated into the geometry of the mandrel so that the fixing flanges are integral with the respective ends of the core.

7. Method of claim 1, wherein inserts or other fixing elements are assembled on the mandrel and then encapsulated in the metal layer when the latter is electroformed onto the outer shell of the mandrel to form the core of the device.

8. Flexible waveguide device, of the bellows type, for guiding a radio frequency signal at a given frequency range, the device comprising:

a core comprising outer and inner side walls, the inner walls delimiting a waveguide channel, two fixing flanges connected to or integral with respective ends of the core, and at least three flexible corrugated portions formed on respective parts of the outer side walls of the core and comprising a plurality of circumferential ribs adjacent to each other, wherein each rib is devoid of corrugation along its circumference.

9. Device of claim 8, wherein the flexible corrugated portion may or may not be centered with respect to the two fixing flanges.

10. Device of claim 8, wherein the distance between each adjacent rib may vary between 0.1 and 5.0 mm and preferably between 0.5 and 2.0 mm as the device moves from a compressed configuration to an expanded configuration.

11. Device of claim 8, comprising three flexible corrugated portions formed on the outer sidewall part of the core, two of the three flexible corrugated portions being respectively adjacent to the first and second fixing flanges while one of the three flexible corrugated portions is centered or not with respect to said fixing flanges.

12. Device of claim 8, wherein the cross-section of the core along the channel is circular, elliptical, oval, hexagonal, square or rectangular.

13. Device of claim 8, wherein the cross-section of the core is non-constant along the channel.

14. Device of claim 8, wherein the two fixing flanges comprise each a reinforcement in order to increase the rigidity of the flanges.

15. Device of claim 8, wherein the outer side walls of the core are an electroformed part and in that inserts or other fixing elements are encapsulated in the electroformed part.

* * * * *